L. M. STEEN.
REEL.
APPLICATION FILED NOV. 20, 1918.
1,301,189.  Patented Apr. 22, 1919.
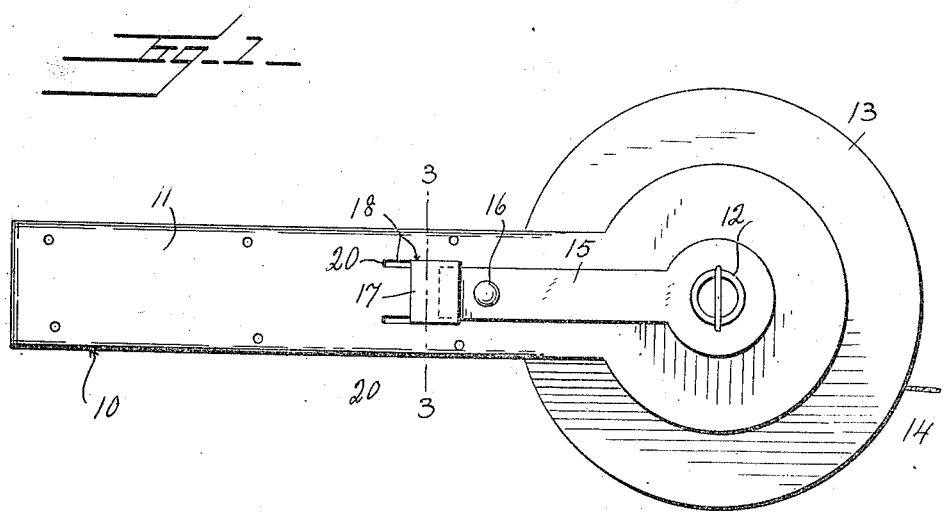
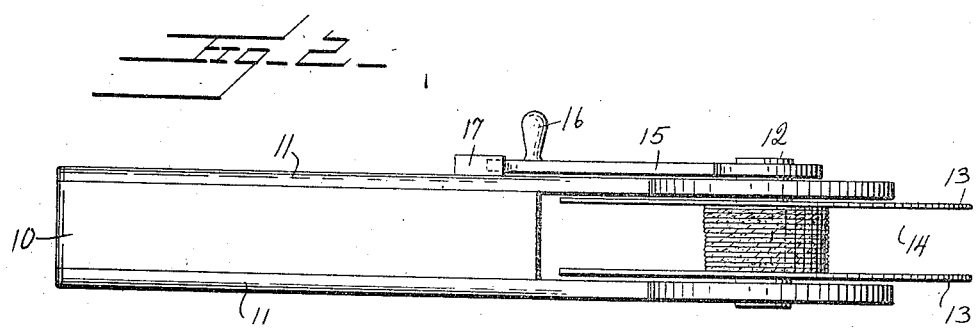
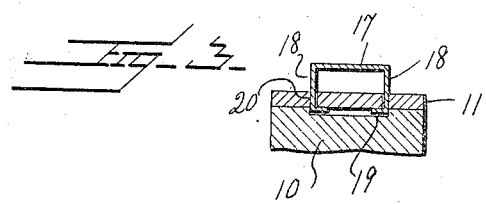
Inventor
L. M. Steen
By Watson E. Coleman
Attorney

UNITED STATES PATENT OFFICE.

LOUIS M. STEEN, OF BISBEE, ARIZONA.

REEL.

1,301,189. Specification of Letters Patent. Patented Apr. 22, 1919.

Application filed November 20, 1918. Serial No. 263,346.

*To all whom it may concern:*

Be it known that I, LOUIS M. STEEN, a citizen of the United States, residing at Bisbee, in the county of Cochise and State of Arizona, have invented certain new and useful Improvements in Reels, of which the following is a specification, reference being had to the accompanying drawings.

This invention relates to reels and particularly to reels such as are used by carpenters and other workmen.

The general object of the invention is the provision of means whereby the reel may be held from rotation whenever desired, as for instance when a certain amount of line has been reeled out.

A further object is to provide a reel with a handle whereby it may be readily carried, the means for locking the reel from rotation being mounted upon the handle in a position to be operated by the thumb of the operator.

My invention is illustrated in the accompanying drawings, wherein:—

Figure 1 is a face view of a reel constructed in accordance with my invention;

Fig. 2 is a side elevation thereof; and

Fig. 3 is a fragmentary section on the line 3—3 of Fig. 1.

Referring to these drawings, 10 designates the handle of the reel which may be made of any suitable material and upon each side of which is attached the strips 11 which may be made of metal, wood or any other suitable material. These strips 11 at their outer ends are enlarged and the strips are formed to provide central bearings for the transversely extending, preferably tubular reel shaft 12, which forms the barrel of the reel. Attached to this tubular shaft 12 are the spaced disks 13 to form the ends of the reel. A cord or line 14 is attached to the reel shaft in any suitable manner and is wound up thereon between the disks 13. To one end of the reel shaft, exterior of one of the strips 11, is attached the crank arm 15 having adjacent its extremity the crank handle 16.

For the purpose of locking the reel from accidental unwinding I mount upon the handle 10, and specifically upon one of the strips 11, the slide 17. This slide, as illustrated in Fig. 3, is approximately U-shaped in cross section and has downwardly extending side portions 18 with outwardly extending flanges 19. The strip 11 is longitudinally slotted as at 20 for the accommodation of the portions 18 and the flanges 19 extend beneath the strip 11 and between this strip and the body of the handle. With this construction the slide 17 may be readily shifted over the extremity of the crank arm 15 when the latter is in alinement with the slide or the slide may be readily pulled back to free the handle.

It will be obvious that with this device the reel may be readily held at any point so that any desired length of line may be unwound from the reel. The handle provides means whereby the reel may be readily carried and handled. The device may be used for measuring chalk lines or implements of like character.

I claim:—

1. A device of the character described including a handle, a reel rotatably mounted therein and having a crank arm, said arm having a laterally projecting handle disposed inward of the end of the arm, and a slide mounted on the handle for movement longitudinally thereof to engage over the extremity of said crank arm when shifted to one position to prevent a rotation of the crank arm.

2. A device of the character described comprising a handle bifurcated at one end, a reel shaft passing through the bifurcated portion of the handle, a reel mounted on the shaft, a crank arm attached to one end of the reel shaft and disposed in contiguity with one face of the handle, and a keeper slidably mounted upon the handle and adapted to engage over the outer extremity of the crank arm, the keeper having portions extending downward through spaced slits in the arm and operatively engaged with the arm to prevent detachment.

3. A device of the character described comprising a handle having strips disposed in each side thereof, a reel shaft passing through the strips and carrying spaced disks, a crank arm attached to one end of the reel shaft, the crank arm having a handle projecting from it and disposed inward of the extremity of the crank arm, and a sliding keeper disposed upon one of the strips and adapted to engage the extremity of the crank arm, the keeper having portions extending down through spaced slots in the strip and then extending laterally between the strip and the handle proper.

In testimony whereof I hereunto affix my signature.

LOUIS M. STEEN.